United States Patent Office 3,421,209
Patented Jan. 14, 1969

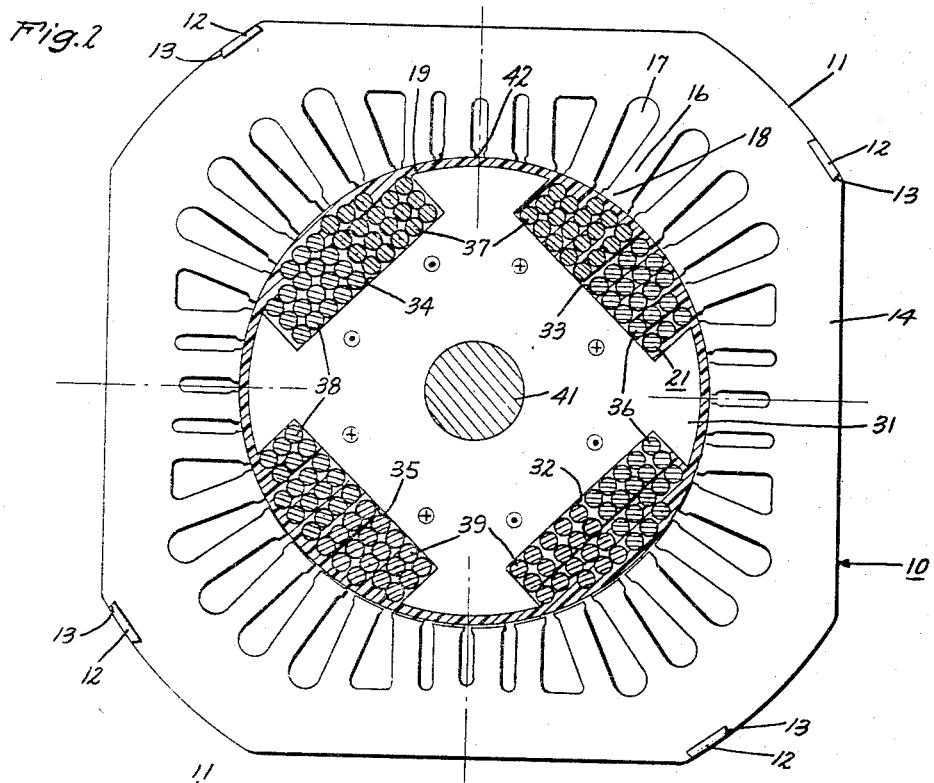
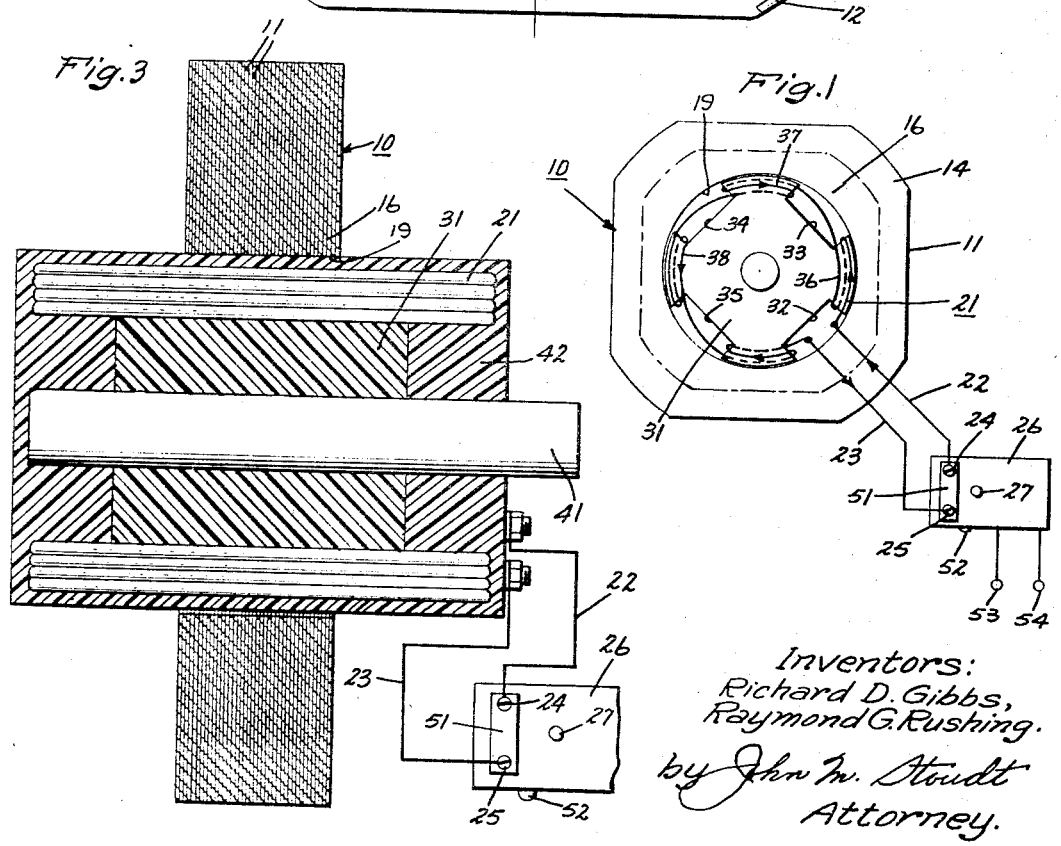

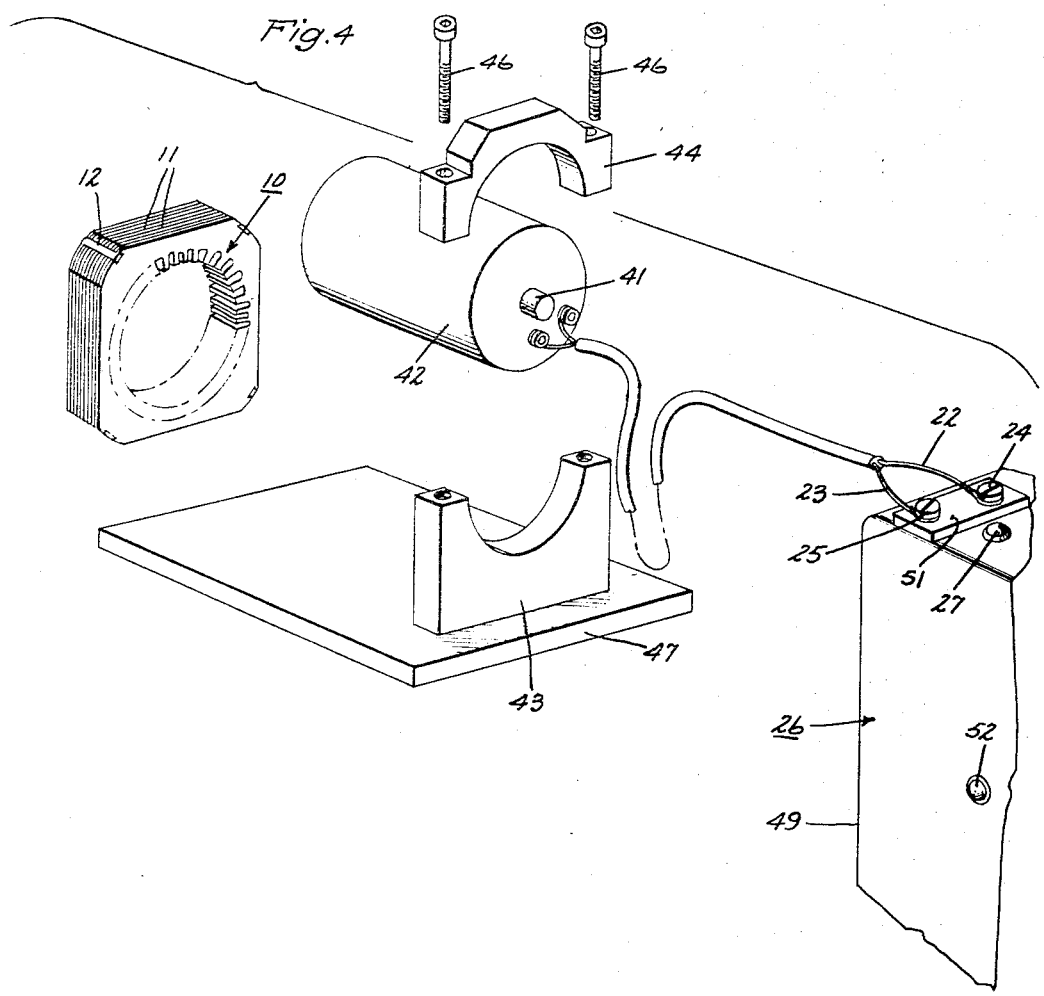
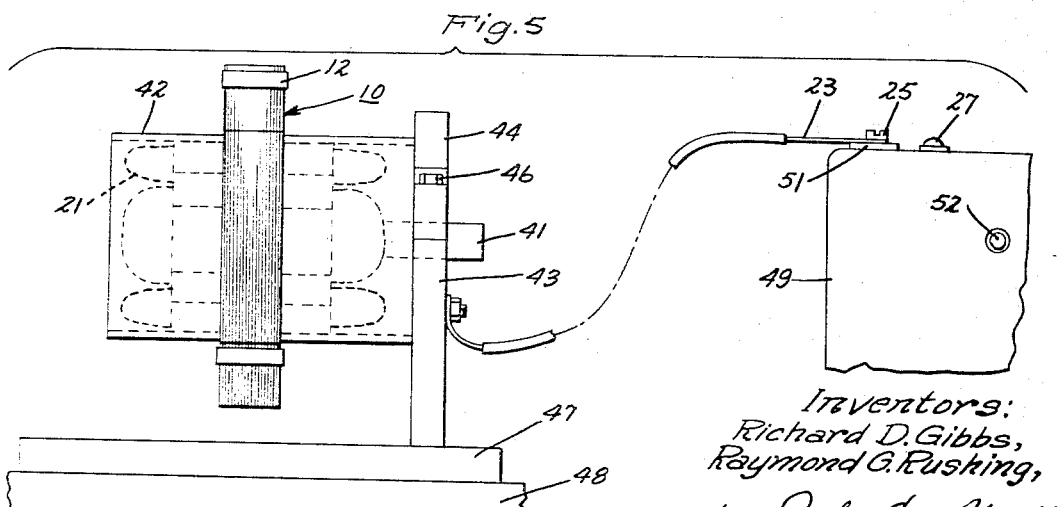
Inventors:
Richard D. Gibbs,
Raymond G. Rushing,
by John M. Stoudt
Attorney.

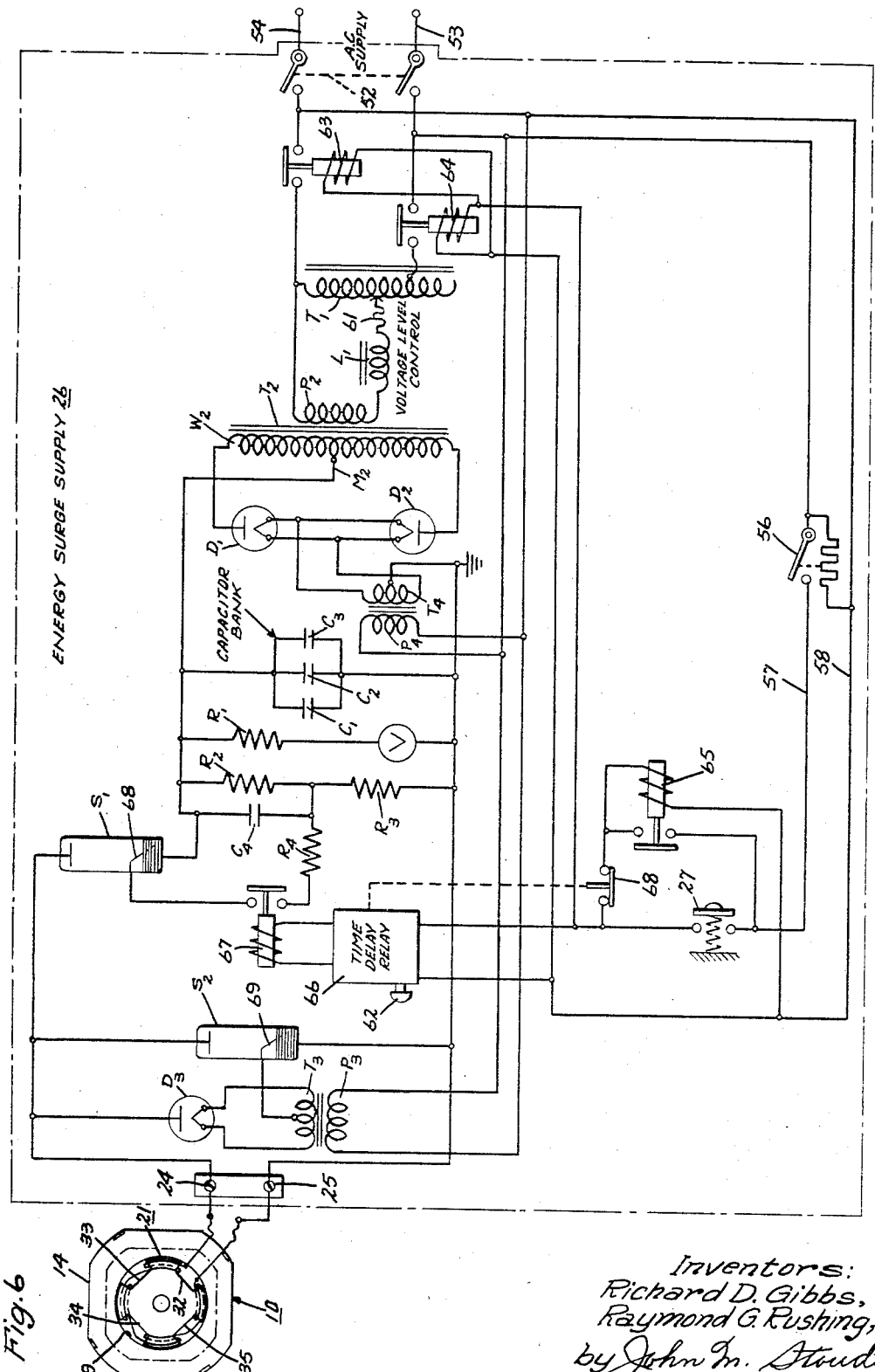

3,421,209
METHOD OF REDUCING ELECTRICAL LOSSES IN ELECTRICALLY CONDUCTIVE LAMINATED STRUCTURES
Richard D. Gibbs, Malta, Ill., and Raymond G. Rushing, Ballston Lake, N.Y., assignors to General Electric Company, a corporation of New York
Filed Jan. 21, 1965, Ser. No. 426,991
U.S. Cl. 29—609                                  7 Claims
Int. Cl. H01f 3/04; H01f 7/06

ABSTRACT OF THE DISCLOSURE

Methods for attaining a desired separation and/or reduction in electrical losses in a number of adjacent elements formed of electrical conductive magnetic material, for instance, a stack of magnetic laminations of a laminated core to be subsequently incorporated into an electrical inductive device. The core may include interlaminate bonds of the type produced when the core has been annealed. An electrical winding is positioned in the vicinity of adjacent laminations, by way of illustration, into the bore of a dynamoelectric machine stator core, and at least one electrical energy surge generated in the winding of a magnitude selected to achieve the desired results. The electrical energy surge establishes a varying magnetic field near the laminations and electromagnetic forces which interact with the laminations to at least partially destroy intimate contact or the interlaminate bond existing between next adjacent laminations. This, in turn, effects the desired reduction in the electrical losses in the core.

The methods not only attain the desired separation of next adjacent magnetic elements but, in addition, where a laminated core is involved, a reduction in electrical core losses may also be achieved without detracting from the structural quality of the core. The methods are easily and rapidly practiced and yet, at the same time, are quite versatile and economical in nature.

Background of the invention

The present invention relates generally to an improved method for attaining the desired separation of a number of adjacent, electrically conductive, elements and more particularly, to an improved method of reducing electrical core losses in electrically conductive laminated structures, such as magnetic cores for use in electrical inductive devices.

In the fabrication of magnetic cores for electrical inductive devices, by way of example, dynamoelectric machines, transformers, electromagnetic switches, and the like, it is customary to form the cores from a preselected number of relatively thin magnetic laminations suitably held together in stacked relation. For instance, these laminations are conventionally stamped or punched into the desired configuration from sheet material; e.g., steel or iron, stacked in accurately aligned relation to furnish a core of a preselected length, and then secured together by welding, keying, etc. while retained in the aligned relation.

In certain instances, the fabricated cores include an interlaminate metallic bond which joins next adjacent laminations together. The bond may occur, for example, where the cores are annealed after the laminations have been secured together. It is believed that during anneal, oxides are formed on the lamination surfaces facing one another which join next adjacent laminations together. When the cores are subsequently mounted in the electrical inductive devices under operating conditions, the interlaminate bond creates eddy currents, among other things, resulting in so-called "core losses"; i.e., undesirable energy losses usually in the form of heat which adversely affect the output of the inductive devices.

In an attempt to break the interlaminate bonds and reduce the losses in the core resulting from the bonds, it is common practice to use an impact force on the cores. This may be accomplished in any number of ways, such as striking the periphery of the core with mallets or the like, dropping the laminated core onto a hard surface from a predetermined height, mechanically separating the laminations by rotating blades which enter between the laminations, and core vibrating techniques. None of these procedures has been entirely satisfactory to date for several reasons. The procedures tend to be expensive to practice from the standpoint of labor and equipment and the result is not always desirable. For example, in stator cores having a number of tooth sections terminating in a center rotor receiving bore, the tooth sections may become deformed to the extent that the cores must be discarded, adding expense to the overall manufacture of the cores. In addition, regardless of the impact forces involved, there is no guarantee that the interlaminate bond will be sufficiently destroyed to attain the desired reduction in the core loss.

Summary of the invention

It is therefore a primary object of the present invention to provide an improved method for attaining the desired separation of a number of adjacent, electrically conductive elements. It is another object of the invention to provide an improved method for reducing electrical losses in a laminated structure formed of magnetic material.

It is another object of the present invention to provide an improved, yet easily practiced, low cost method for effectively destroying, in an efficient manner, interlaminate bonds existing between next adjacent laminations in a laminated magnetic core for use in electrical conductive devices such as might occur, by way of illustration, from an annealing operation performed on the core.

In carrying out the present invention in one form, we provide an improved method for attaining the desired separation and reduction in electrical losses in a number of adjacent elements formed of electrical conductive magnetic material which are secured together in a predetermined stack relation, such as a stack of magnetic laminations of a laminated core for use in an electrical inductive device. By way of illustration, in a core, at least some of the next adjacent laminations are in intimate face to face relation. Initially, electrical means for conducting electrical energy is positioned in the vicinity of the adjacent laminations and at least one electrical energy surge of a magnitude selected to achieve the desired results is generated in the electrical means. This magnitude is selected below that which will detrimentally affect the means securing the laminations together. The electrical energy surge causes a surge of electric current to flow through the electrical means and to establish a varying magnetic field near the laminations. This field, in turn, produces electromagnetic forces which interact with the next adjacent laminations to destroy their intimate contact and effect the desired reduction in electrical loss of the core.

Among other things, the foregoing results are achieved without the need for impact forces commonly being employed today with their accompanying tendency to deform the laminations of the core. The present invention also provides a low cost method of obtaining element separation and reduction in electrical core loss while at the same time, retaining the original structural quality of the core, which does not vary appreciably from one core to another during the practice of our invention. In addition, it is possible to obtain the foregoing advantages by a method which is readily controlled, versatile, economical, may be easily and rapidly practiced, and produces effective results.

*Brief description of the drawings*

The subject matter which we regard as our invention is particularly pointed out and distinctly claimed in the concluding portion of this specification. Our invention, itself, however, both as to its organization and method of operation, together with further objections and advantages thereof may best be understood by reference to the following description taken in connection with the accompanying drawing in which:

FIGURE 1 is a schematic end view of a stator core formed of a laminated stack with laminations being separated a selected amount and the core losses being reduced by one form of the preferred method of the present invention using equipment which may be employed to practice our invention, the illustrated equipment including an excited primary winding which is carried by a coil accommodating member arranged in the bore of the core and is connected in circuit with an energy surge supply;

FIGURE 2 is an enlarged end view of the stator core, the excited primary winding, and the coil accommodating member schematically depicted in FIGURE 1, showing the current flow through the winding conductors, an actual sectional view of the coil accommodating member and the primary winding being illustrated;

FIGURE 3 is a selectional view of the stator core and equipment illustrated in FIGURE 1 to reveal details;

FIGURE 4 is an exploded view in perspective of an arrangement which may be employed in the practice of our invention to support the primary winding and stator core of the exemplification while an energy surge is being supplied from the energy surge source to the winding with only a fragmentary part of the energy surge source being shown;

FIGURE 5 is a side view of the arrangement and stator core seen in FIGURE 4 in assembled relation; and FIGURE 6 is a schematic circiut diagram of an energy surge source which may be utilized in the practice of our invention.

*Description of the preferred embodiment*

For the purpose of explaining the principles of our invention, the drawings illustrate various aspects of the improved method as applied to the fabrication of a laminated stator core 10. In the illustrated embodiment, the core is adapted for use in the type of stator disclosed in U.S. Patent 2,795,712, issued to Fred W. Suhr on June 11, 1957 and assigned to the same assignee as the present invention. Core 10 is constructed of a predetermined number of aligned laminations 11, each punched or stamped from suitable relatively thin magnetic sheet material, such as iron or electrical steel, into the illustrated configuration. The laminations are conventionally secured together in stacked face to face relation by a number of keys 12 frictionally received in complementing notches 13, provided at spaced apart locations on the outer edges of the individual laminations and aligned axially across the stack. In the usual way, the laminations are aligned to form an outer yoke section 14 and angularly spaced apart tooth sections 16 projecting inwardly from the yoke section to define a corresponding number of winding accommodating slots 17 therebetween. The tooth sections each terminate in an enlarged lip portion 18, the inner edges of the lip portions together defining a central opening or rotor receiving bore 19. Before one form of our inventive method is carried out on core 10 of the exemplification, the core has been conventionally annealed. In actual practice, a number of cores constructed in accordance with the illustrated embodiment were annealed in a controlled pre-heated atmosphere of approximately 800° C. for a period of 40 minutes.

In order to attain the desired separation of the individual laminations 11 of core 10 in the exemplification and reduce the electrical losses, such as might occur for instance, from intimate engaging relation of next adjacent lamination faces and any interlaminate bond resulting from the anneal, we initially position the core in the vicinity of electrical conducting means, and supply an energy surge of selected magnitude in the electrical conducting means. More specifically, in the illustrated embodiment, a primary, electrically conductive winding 21 is arranged in the bore 19 of core 10 and as better seen in FIGURES 1 and 3, is connected by leads 22, 23, in circuit to connector terminal posts 24, 25 of an energy or power surge source 26. A high energy surge is applied to primary winding 21 by depressing the pushbutton of a pushbutton switch 27 to produce a surge of current flowing through individual conductors of the primary winding 21 as indicated by the arrows in FIGURE 1, and by the conventional symbols $\oplus$ and $\odot$ in FIGURE 2. The former symbol denotes direction of flow downwardly through the drawing while the latter connotes a direction of current flow outwardly toward the observer.

In particular, depression of switch 27 operates the energy surge source 26 by first charging a capacitor bank to a predetermined or selected voltage and then by discharging the electrical energy from the capacitor bank in the form of a sudden energy surge of preselected magnitude through primary winding 21.

A varying magnetic field is created by the high energy surge distributed around the inner periphery of core 11 which produces electromagnetic forces, the forces interacting with the laminations to cause relative movement of next adjacent laminations. These forces effect the desired separation, tending to effectively destroy the intimate engagement of the laminations in locations other than at keys 12 and any interlaminate bonds, such as oxides resulting from the anneal operation which join next adjacent laminations together. In this way, it is believed that the forces interact with the laminated core and by virtue of the interaction effect a significant reduction in the electrical losses of the core. This reduction in turn results in a corresponding reduction in energy losses in the form of heat in the core when it is performing its designed function in its electrical inductive device; e.g., an electric motor in the case of stator core 11 of the exemplification.

The desired separation and reduction in electrical loss can be achieved by our invention without the employment of impact forces on the core and the resulting material deformation which normally accompanies the use of these impact forces. In addition, by the present invention, it is possible to control the degree of separation and reduction in electrical loss attained for a given application, the results being consistently good without much variation between cores. These and other benefits and advantages will become more apparent as the description proceeds.

Turning now to a consideration of the magnitude of the energy surge selected to obtain the desired lamination separation and electrical loss in core 10 of the exemplification, it will be recognized that the exact magnitude and number of surges for a given application are dependent upon such factors as: the exact construction of the electrical conducting means, such as primary winding 21, the material and exact construction of the elements being acted upon; the type and strength of lamination securement utilized, and the results desired. In the exemplification, the selected magnitude should not be so great that the securement of the laminations 11 in stack relation will be adversely affected nor such that the laminations will be distorted or bent so as to make the core useless.

To illustrate the foregoing, the following example is given showing typical results achieved when our method was carried out on a number of cores 10 built in accordance with the illustrated embodiment. For ease an identification, identical numbers in the example below will be used as employed in the drawings. A number of cores 10 were built with the following nominal dimensions:

| | | |
|---|---|---|
| Corner to corner dimension | inches | 6.291 |
| Number of slots 16 | | 36 |
| Bore 19 diameter | inches | 3.488 |
| Lamination thickness | do | 0.025 |
| Axial stack length | do | 0.938 |

The unit carrying winding 21 had an outside diameter of 3.110 inches.

The results achieved with our invention in one core will be presented and are representative of the benefits of one form of our invention. After core 10 was annealed at 800° centigrade for forty minutes and it had returned to ambient temperature conditions; e.g., 25° centigrade, its electrical core loss was measured in accordance with the so-called "Wattmeter" or comparative watts test technique. Two toroidal coils with 32 and 64 wire turns were wound through the bore 86 and over the yoke section 84 circumferentially around the core 82. The first coil was connected to the current coil of the wattmeter and the second one to the potential coil of the same meter. Alternating current, passed through the first coil, produced magnetic flux in the core which was sensed by the second coil to provide a reading on the wattmeter indicative of the electrical losses in the core under the test conditions. The core of the example had a 9 watt electrical loss at 5 volts measured by this technique.

Energy source 26 included a capacitor bank having a capacitance rating of 630 microfarads which was initially charged to a level of 2000 volts (1260 joules) and after 15 seconds the energy surge was discharged from the capacitor bank into primary winding 21, with core 10 and the winding 21 having the relative positions displayed in FIGURES 1, 3 and 5. This magnitude produced no observable relative movement of the individual laminations nor any significant reduction in electrical core loss.

The capacitor bank was then successively charged to voltage levels of 2200 and 3000 to provide energy surges of 1525 and 2840 joules respectively. Relative movement of laminations 11 were visually observed at a surge of 1525 joules, the laminations separating slightly other than at keys 12, and the electrical loss at 5 volts was reduced to seven and one-half watts. At the 2840 joule surge, the outside laminations at tooth sections 16 began to separate slightly in an axial direction but the core still was capable of satisfactory use. The electrical loss was further reduced to a value of seven watts at 5 volts. For the satisfactory utilization of any magnitude in excess of the third surge in the example just considered axial support of the lamination end faces is required as by suitably containing the core end between stationary, rigid, restraining walls; e.g., enlarged rigid washers or the like clamping the core therebetween.

Having more specific reference to FIGURES 2 through 5, we have illustrated equipment which may be used in the practice of our present invention. The equipment includes apparatus of the type more fully disclosed in U.S. patent application Ser. No. 414,825, filed Nov. 30, 1964, of Clovis E. Linkous, now U.S. Patent No. 3,333,330. Primary winding 21 is carried by a winding accommodating member 31 or fixture formed of cured insulating resin and having four slots 32, 33, 34, 35 for accommodating the coil side portions of the four coil groups 36, 37, 38, and 39 of primary winding 21. The coil groups are carried by member 31 to form four magnetic poles of alternating magnetic polarity. Member 31 also includes a centrally disposed stub shaft 41 for supporting the member during the insertion of the coil groups into their accommodating slots. After such insertion, the coil groups and member 31 are encased in a cured thermosetting epoxy resin 42 (FIGURES 2 and 3 in particular) to form the cylindrically shaped primary winding unit which in the illustrated embodiment has an overall diameter slightly less than that of the internal bore diameter of core 10. This unit serves to support the core with its axis generally horizontal, as best shown by FIGURES 2, 3 and 5, during the practice of our invention.

With reference to FIGURES 4 and 5 in particular, a cradle bracket 43 and a clamping element 44 removably fastened to the cradle bracket by screws 16 rigidly hold the winding unit. For stability, cradle bracket 43 is, in turn, mounted onto a base plate 47 which may be placed on a table 48 to provide the axis of the core 10 and winding 21 horizontally.

Still referring to FIGURES 4 and 5, the components for the energy surge supply 26 may be housed within a cabinet or casing 49 which also mounts an insulator board 51 carrying terminal posts 24, 25, a main "off-on" switch 52 for initially activating certain components of supply 26, and the pushbuttom switch 27 for operating the supply to energize primary winding 21.

Having more specific reference now to FIGURE 6, we will now more fully describe the operation of the power pulse or energy surge source 26 as shown generally in the previous figures in block diagram form. An example of specific components incorporated in the illustrated source 26 which may be used are more particularly identified in co-pending application Ser. No. 414,826 filed Nov. 30, 1964. In order to provide a high energy surge of preselected magnitude, a bank of three parallel connected storage capacitors $C_1$, $C_2$, and $C_3$ is charged to a selected level, between 500 and 4000 volts, by way of example and the capacitor bank is then discharged by switching an ignitron $S_1$ into conduction.

The energy surge source 26 is energized through the terminals 53, 54 which are adapted for connection to a suitable alternating supply, such as 120 volt, 60 cycle commercial supply. In the actual energy surge source 26 used in the practice of the invention, the terminals 53, 54 were brought out to a three-prong plug along with a ground lead for use in conjunction with a grounded type receptacle. Main on-off switch 51 is provided to make power immediately available for certain operating components of the power pulse source 26 and to completely deenergize the pulse source 26 when not in use. When the on-off switch 51 is closed, it will be noted that the primary windings $P_3$, $P_4$ of filament transformers $T_3$, $T_4$ are immediately energized.

A bimetallic time delay switch 56 is provided to insure that plate voltage cannot be applied on rectifier tubes $D_1$, $D_2$, $D_3$ until the grids have been warmed up for at least 30 seconds. It will be seen that leads 57 and 58 which connect the supply in circuit with the operating pushbutton switch 27 are not energized until after lapse of a predetermined interval as determined by the bimetallic time delay switch 56.

Before initiating the operation of the surge source 26, the voltage level to which the capacitor bank is charged is set by an adjustable arm 61 of control autotransformer $T_1$. The autotransformer $T_1$ controls the voltage applied across the primary $P_2$ of step-up transformer $T_2$ and thereby also controls the voltage between the center point $M_2$ and one end of the secondary winding $W_2$ of step-up transformer $T_2$. Also, the time delay control 62 is set to provide a selected delay interval before the capacitors $C_1$, $C_2$ and $C_3$ are discharged. This delay interval must be at least as long as the time required to charge the capacitors $C_1$, $C_2$ and $C_3$.

To start charging the capacitor bank, the push button 44 is depressed to actuate the relays 63, 64, 65 and thereby cause the time delay relay 66 and control autotransformer $T_1$ to be energized. With the control autotransformer $T_1$ energized, the primary winding $P_2$ of step-up transformer $T_2$ is energized, the peak current in the primary circuit being limited by a choke $L_1$.

A full wave rectified current for charging the capacitors $C_1$, $C_2$, $C_3$ is provided by a rectifier utilizing a pair of high voltage rectifiers $D_1$ and $D_2$ and a center tap secondary winding $W_2$ of step-up transformer $T_2$. The two rectifiers $D_1$ and $D_2$ alternately conduct current since, at any given instant, one plate is positive while the other is negative.

A voltmeter V is connected in series with a multiplier resistor $R_1$ across the capacitor bank. The voltmeter provides an indication of the voltage level on the capacitor bank and permits a visual check to be made on the voltage on the capacitors $C_1$, $C_2$, $C_3$ to insure that a power pulse of the selected magnitude is supplied to the primary winding of the fixture 31.

The firing circuit for the ignitron $S_1$ includes a capacitor $C_4$ which is charged by the full-wave rectified voltage across the capacitor bank through a voltage divider consisting of resistors $R_2$ and $R_3$. During the charging period of the capacitor bank, the capacitor $C_4$ of the firing circuit is also being charged. A resistor $R_4$ connected in the discharge circuit of the capacitor $C_4$ controls its rate of discharge when it is discharged by relay 67 to fire the ignitron $S_1$.

After the capacitors $C_1$, $C_2$ and $C_3$ are charged to the selected voltage level, the time delay interval provided by the setting on the time delay relay 66 will run out, and relay 67 closes and causes capacitor $C_4$ to discharge through the starter rod 68 of the ignitor $S_1$ to force it into conduction. When the ignitron $S_1$ conducts, it causes the capacitor bank to discharge through the primary winding of fixture 31 connected across the connector terminal posts 24, 25.

In order to prevent reverse current flow through the capacitor bank, a second ignitron $S_2$ is connected across the connector terminal posts 24 and 25. When the polarity of the voltage across the connector terminal posts 24, 25 reverses, the voltage at the plate of the high voltage rectifier $D_3$ will be positive and rectifier $D_3$ will conduct current to apply a positive potential at the starter rod 69 of the ignitron $S_2$. The reverse current flow is thereby shunted and does not pass through the capacitor bank. A short interval after relay 67 is actuated to the closed position to discharge capacitor $C_4$, the time delay relay 66 also causes the switch 68 to momentarily open and restore the relays 63, 64, and 65 to their normally open condition.

If a second high energy surge is to be supplied to primary winding 21, the arm 61 on the control autotransformer $T_1$ is adjusted to provide the second selected voltage level on capacitors $C_1$, $C_2$ and $C_3$. If a longer time delay relay interval is required, the control 62 of the time delay relay 66 is set to provide the desired time delay interval corresponding to the second selected voltage. To initiate the operation of the surge source 26, the pushbutton of switch 27 is again depressed thereby initiating the charging of the capacitor bank, and after the selected time interval, the capacitor bank is discharged to provide a second high energy surge.

From the foregoing description of our preferred method, exemplifying the invention, it will be apparent that by our invention we are able to provide an improved method for economically and efficiently achieving a desired separation of electrically conductive, magnetic elements, for instance, laminations and transformer, rotor and stator cores. In addition, our improved method is readily controlled and extremely versatile in nature since it can be practiced with elements of unusual configurations and still attain effective results. Furthermore, with specific reference to cores for use with electrical inductive devices, it can also produce a significant reduction in electrical core loss without adversely affecting the quality of the core normally accompanying methods utilizing impact forces directly on the core periphery.

It will therefore be appreciated that although in the illustrated exemplification the principles of our invention were applied to a laminated core for dynamoelectric machines, the invention can be advantageously carried out with magnetic or electrical conductive elements for use in other electromagnetic devices and apparatus where it is desirable to effect element separation and/or reduction in electrical losses. In addition, for certain applications, a single electrical conductor positioned in the vicinity of the elements might be sufficient to conduct the energy surge for creating the necessary forces; however, for core 11 of the illustrated embodiment, a winding having a number of coil groups is preferable for excitation since it tends to distribute the magnetic field entirely around the circumference of the core, rather than concentrate it at a few tooth sections.

While we have shown and described a preferred embodiment of the invention, it will be obvious to those skilled in the art that changes and modifications may be made without departing from the invention. It is therefore intended in the appended claims to cover all such changes and modifications that fall within the true spirit and scope of our invention.

What we claim as new and desire to secure by Letters Patent of the United States is:

1. A method for attaining the desired separation and reduction in electrical losses of a number of adjacent elements formed of electrically conductive material and secured together in a predetermined relation comprising the steps of: establishing a varying magnetic field produced by at least one electrical energy surge having a magnitude selected to accomplish the desired separation and reduction in electrical losses, with a number of adjacent and secured together electrically conductive elements being positioned in the vicinity of the varying magnetic field; and effecting the desired separation of the elements, one from the other while achieving the reduction in electrical losses by the interaction between electromagnetic forces created by the varying magnetic field and the adjacent elements.

2. A method for attaining the desired reduction of electrical losses in a laminated structure formed of magnetic material comprising the steps of: positioning electrical conducting means for conducting electric current and the laminated structure in the vicinity of one another; applying at least one electric current surge of a magnitude selected to produce the desired reduction to the electrical conducting means; and effecting the desired reduction of electrical losses by means of electromagnetic forces produced by a varying magnetic field which is created by the at least one electric current surge, with the forces acting on the structure at least in the regions of the laminated structure near the electrical conducting means produced by virtue of the electric current surge.

3. A method for attaining the desired separation of a number of adjacent elements formed of magnetic material comprising the steps of: establishing a varying magnetic field produced by at least one electric energy surge having a magnitude sufficiently high to accomplish the desired separation, with a number of adjacent magnetic elements capable of predetermined movement being disposed in the varying magnetic field; and effecting the desired separation of the elements one from the other by the interaction between electromagnetic forces resulting from the varying magnetic field and the individual elements.

4. A method for attaining the desired separation of a plurality of adjacent electrically conductive elements comprising the steps of: positioning electrical conducting means for conducting electric current and the adjacent elements in the vicinity of one another; supplying at least one electrical energy surge of sufficient magnitude to achieve the desired element separation, said electrical energy surge generating a surge of electric current flow through the electrical conducting means and creating a varying magnetic field; and effecting the desired separation of the plurality of elements by electromagnetic forces produced as a result of the electric current flow and varying magnetic field, acting on the adjacent elements.

5. A method of reducing electrical losses in a structure formed by a number of magnetic elements and means for securing the elements together in adjacent relation, the method comprising the steps of: positioning electrical means for conducting electric currents and the adjacent elements in proximity with one another; producing at least one electrical energy surge in the electrical means of a magnitude selected to achieve the desired reduction in electrical loss without destroying the securing means, the at least one electrical energy surge causing a surge of electric current flow in the electrical means; and effecting the desired reduction in electrical loss by means of a varying magnetic field and resulting electromagnetic forces generated in the elements which interact with the elements to produce the desired electrical loss reduction.

6. A method for reducing electrical losses in a structure formed by a number of magnetic elements and means securing the elements together in adjacent relation, with the structure including an opening therein and having at least some of the next adjacent elements in intimate contact, the method comprising the steps of: positioning a part of electrical means for conducting electric current in the opening of the structure; generating at least one electrical energy surge in the electrical means of a magnitude selected to achieve the desired reduction in electrical loss without detrimentally affecting the securing means, the at least one electrical energy surge causing a surge of electric current flow through the electrical means and a varying magnetic field in the vicinity of regions of the magnetic elements; and effecting the desired electrical loss reduction by means of electromagnetic forces, produced by the electric current flow, in the element regions which act to destroy at least partially the intimate contact of next adjacent elements.

7. A method of reducing electrical core losses in a stator core formed by a number of magnetic laminations and means securing the laminations together in face-to-face adjacent relation, with the core including a bore extending axially therethrough and having at least some of the next adjacent lamination faces in intimate contact, the method comprising the steps of: positioning a primary electrical winding in the bore of the core; producing at least one electrical energy surge in the winding of a magnitude selected to achieve the desired reduction in electrical core loss without detrimentally affecting the lamination securing means and the lamination faces, the electrical energy surge causing a surge of electric current flow in the winding thereby creating a varying magnetic field in the lamination regions near the winding; and effecting the desired electrical core loss reduction by means of electromagnetic forces generated by the magnetic field in the lamination regions which act to destroy at least partially the intimate contact of the at least some of the next adjacent lamination faces.

References Cited

UNITED STATES PATENTS 3,118,220   1/1964   Somerville et al. _____ 29—239

JOHN F. CAMPBELL, *Primary Examiner.*

J. L. CLINE, *Assistant Examiner.*

U.S. Cl. X.R.

29—239, 427, 421